United States Patent Office 3,344,753
Patented Oct. 3, 1967

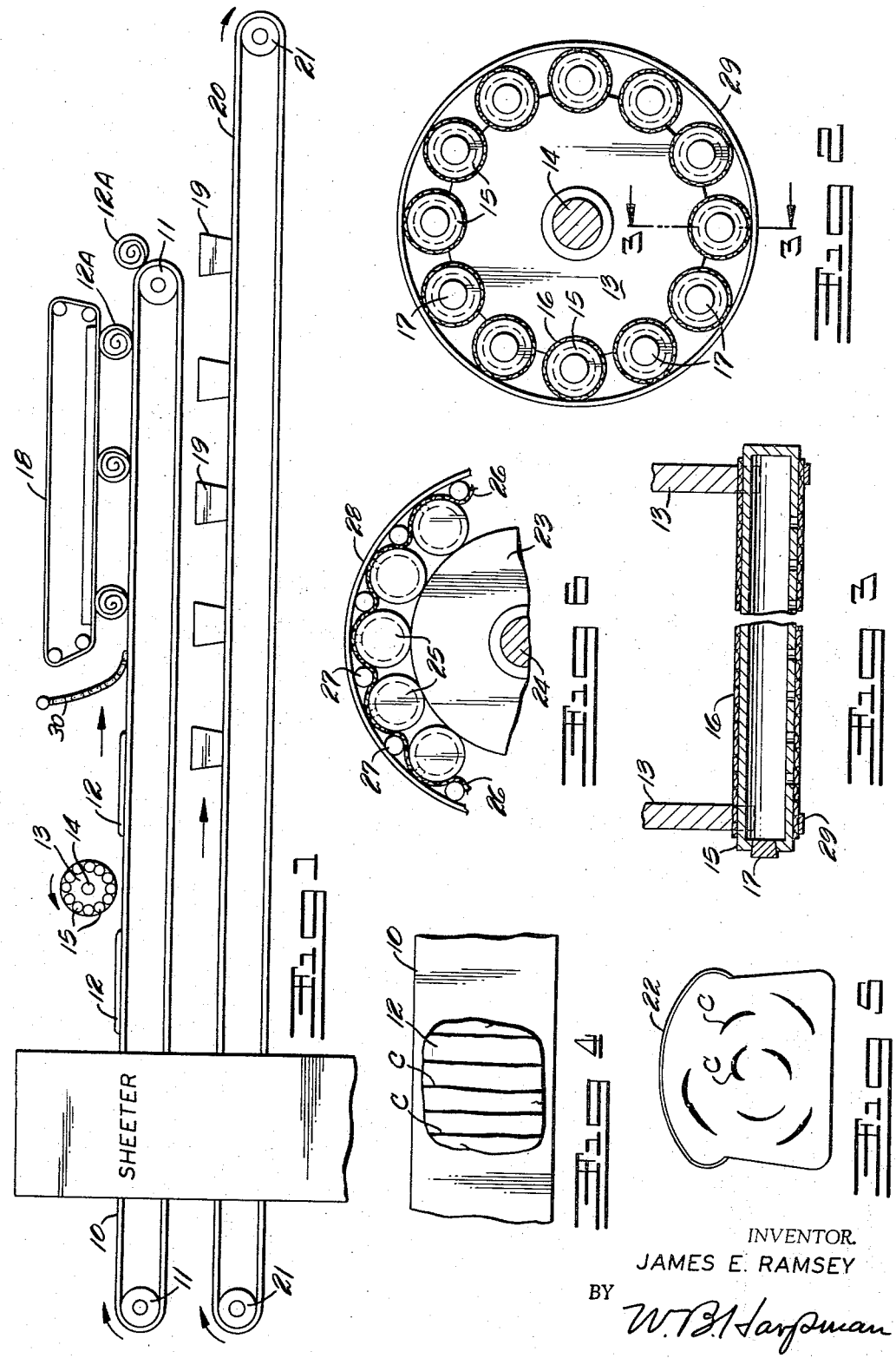

3,344,753
METHOD FOR APPLYING COLOR TO BREAD DOUGH
James E. Ramsey, 111 Aiken Road, New Castle, Pa. 16101
Filed May 1, 1964, Ser. No. 364,170
2 Claims. (Cl. 107—54)

This invention relates to a method for making bread and particularly the method for sheeting the bread dough and delivering it in sections to the curling chain apparatus where the section of sheeted dough is rolled and then deposited in a baking pan.

The principal object of the invention is the provision of a method of applying spaced various colors transversely of the flat sheeted dough in a bread making operation.

A further object of the invention is the provision of a method of forming a loaf of bread with circumferentially spaced, radially positioned color streaks in the baked loaf.

A still further object of the invention is the provision of a method for applying streaks of various colors to portions of sheeted dough in a bread making machine prior to the dough being rolled by the curling chain of the apparatus.

A still further object of the invention is the provision of a method of applying spaced streaks of various colors to sheeted bread dough which is simple, efficient and inexpensive in operation.

The bread loaves produced in commercial bakeries are formed by placing pieces of dough in a sheeter, which device rolls the dough into sheets which are of appropriate size and delivers these small sheet-like portions to a conveyer belt. The portions then travel on the conveyer belt and pass beneath a curling chain which is an arrangement known in the art which imparts a rolling action to the pieces of sheeted dough and at the same time guides them in under a molding device which is spaced vertically above the conveyer belt on which they are traveling so that the pieces of dough, having been initially curled by engagement with the curling chain, will then roll up into roll-like sections which are then delivered from the end of the conveyer belt into the baking pans, all as will be understood by those skilled in the art.

The present invention relates to a method of imparting streaks of color to the flat cut sheet portions of dough after they leave the sheeter and before they engage the curling chain, as just described. The sections of dough which are rolled by the action of the conveyer belt moving the same against the molding device rolls up the sheets of dough with the color streaks inside, and when the loaves of bread are baked the streaks of color appear lengthwise of the loaf in radial and circumferentially spaced relation to the axial center of the loaf.

With the foregoing and other objects in view which will appear as the description proceeds, the invention resides in the method hereinafter described and claimed, it being the intention to cover all changes and modifications of the example of the invention herein chosen for purposes of the disclosure, which do not constitute departures from the spirit and scope of the invention.

The invention is illustrated in the accompanying drawings, wherein:

FIGURE 1 is a symbolic illustration of bread making apparatus incorporating the invention.

FIGURE 2 is an enlarged end elevation of a color applying device seen in FIGURE 1.

FIGURE 3 is a vertical section on line 3—3 of FIGURE 2.

FIGURE 4 is a top plan view of a portion of sheeted cut dough with the color streaks applied thereto, according to the invention.

FIGURE 5 is a plan view of a slice of bread from a loaf colored in accordance with the invention and showing the color streaks therein.

FIGURE 6 is an end view of a portion of a modified color tube assembly.

By referring to the drawings and FIGURE 1 in particular, it will be seen that a conveyer belt 10 trained over driving rolls 11, 11 passes through a sheeter which, as known in the art, receives dough and forms the same into flat appropriately sized portions of dough and deposits them on the conveyer belt 10.

In FIGURE 1 of the drawings, two flat cut portions of dough are indicated by the numerals 12, 12 and arrows indicate the direction of travel of the conveyer belt 10. Positioned in spaced relation to the sheeter and above the conveyer belt 10, there is a color applying cylindrical device comprising a pair of sprocket-like body members 13, 13 positioned on an axial shaft 14, which is rotatably supported so that the color applying device is positioned immediately above the conveyer belt 10. A plurality of perforated tubular members 15, 15 define the cylindrical surface of the color applying device, and the perforated members 15, 15 are positioned in spaced relation to one another circumferentially of the sprocket-like members 13, 13 by reason of matching configurations formed in the peripheries of each of the sprocket-like body members 13, as may best be seen by referring to FIGURES 2 and 3 of the drawings.

Each of the perforated tubular members 15 is provided with a woven wick-like jacket 16. The jacket 16 is preferably woven fabric or it may be cellulose sponge sheet material, and it will occur to those skilled in the art that, alternately, a fabric or cellulose sponge section of sheet material may be wrapped around the assembly of perforated tubular members 15 and held by a plurality of rods positioned in parallel relation with the tubular members 15 which are in turn held by clamps positioned annularly of the assembly at each end thereof. Such a modification is illustrated in FIGURE 6 of the drawings and will be hereinafter described.

Again referring to FIGURES 2 and 3 of the drawings, it will be observed that each of the perforated tubular members 15 is provided with an end plug 17 so that food coloring appropriately diluted with water may be filled into the perforated members 15 and the same used to apply spaced streaks or stripes of various colors to the surface of the cut portions of dough 12 that pass beneath the color applying device, as seen in FIGURE 1 of the drawings. The arrangement of the color stripes on the cut piece of dough 12 may be seen in FIGURE 4 of the drawings wherein a top plan view illustrates the piece of dough 12 with the color stripes thereon indicated by the letters C, it being understood that one stripe will be applied for each of the perforated members 15, which has engaged the surface of the dough portion 12 as it passed therebeneath.

The portions of dough with the color applied then engage the curling chain which imparts an initial curling action to the same and they then move in under the molding device, which is indicated in FIGURE 1 by the numeral 18, as will be understood by those skilled in the art. The pieces of dough continue to be rolled up by the motion of the conveyer belt 10 moving them beneath the molding device 18, and they then take on the appearance of a roll of dough as indicated at 12A in the drawings, and they move off the end of the conveyer belt and into baking pans 19, 19 respectively. The pans 19 are traveling on a secondary conveyer belt 20, which is trained over rollers 21, 21, as will be apparent to those skilled in the art, and the conventional steps of permitting the dough to raise, and then baking the same in appropriate ovens follow to complete a loaf of bread.

By referring now to FIGURE 5 of the drawings, a slice from a loaf of bread formed in accordance with this invention is seen, and it will be observed that the slice has the usual crust portion 22 on the top and upper sides thereof which were above the baking pan when the loaf was baked, and that centrally of the loaf there are longitudinally extending sections of colored dough CC which are circumferentially arranged and radially spaced in exactly the same manner as the coloring applied by the color applying device 15, heretofore referred to, when it applied the color to the flat section of dough 12 from which the loaf was formed.

By referring now to FIGURE 6 of the drawings, it will be seen that it comprises a modification of the construction illustrated in FIGURES 2 and 3 of the drawings, and heretofore described, in that it comprises a roller 23 on a shaft 24 having a plurality of perforated tubular members 25, 25 positioned therearound which are then wrapped or covered in a sheet of fabric 26 which is either woven or of a cellulose sponge porous material, and the perforated tubular members 25 are held in position by a plurality of rods 27, 27 positioned one between each of the perforated tubular members 25 over the sheet of fabric 26 and clamping bands 28, 28 are then applied at the ends of the device to hold the same together. Similar clamping bands 29 are used to hold the color applying perforated tubular members 15 in the arrangement as disclosed in FIGURES 2 and 3.

It will thus be seen that a simple and efficient color applying device for imparting color to loaves of bread has been disclosed and whereby many colors may be applied to a piece of dough which is then formed into a loaf and eventually baked to form a single loaf of bread. The method and apparatus disclosed herein position the colors lengthwise of the loaf so that each slice when cut from a loaf will have the various colors visible in the surface thereof.

It will thus be seen that a method and apparatus for imparting color to loaves of bread have been disclosed which meet the several objects of the invention, and having thus described my invention, what I claim is:

1. A method of forming longitudinally extending colored areas in a loaf of bread which comprises sheeting the dough from which the loaf is to be formed, forming portions of the sheeted dough, applying transversely extending spaced parallel strips of coloring material to the portions of sheeted dough, curling the colored dough portions and rolling the same in a roll and depositing the same in a pan, permitting the dough to raise and subsequently baking the dough to form a loaf having color strips longitudinally thereof.

2. The method of imparting various colored sections to a loaf of bread which comprises sheeting the dough from which the loaf is to be formed, forming portions of the sheeted dough, applying areas of color to the portions of dough, rolling the portion of dough so that the colored areas are separated from one another by intervening layers of the portion of dough, permitting the rolled dough to raise and baking the same to form a loaf of bread.

No references cited.

WALTER A. SCHEEL, *Primary Examiner.*

J. SHEA, *Assistant Examiner.*